United States Patent [19]

Auer et al.

[11] 3,857,882

[45] Dec. 31, 1974

[54] PRODUCTION OF ALPHA-CHLOROACRYLIC ACID

[75] Inventors: Eberhard Auer, Erftstadt Liblar;
Wilhelm Vogt, Huerth-Efferen;
Klaus Gehrmann, Hurth-Knapsack, all of Germany

[73] Assignee: Hoechst Aktiengesellschaft, Frankfurt/Main, Germany

[22] Filed: Aug. 13, 1973

[21] Appl. No.: 387,754

[30] Foreign Application Priority Data

Aug. 18, 1972 Germany............................ 2240663

[52] U.S. Cl............................................. 260/539 R
[51] Int. Cl............................................. C07c 51/00
[58] Field of Search ................................ 260/539 R

[56] References Cited
UNITED STATES PATENTS

| | | | |
|---|---|---|---|
| 2,282,088 | 5/1942 | Pollack | 260/539 R |
| 2,862,960 | 12/1958 | Pollack | 260/539 R |
| 2,870,193 | 1/1959 | Pollack | 260/539 R |
| 3,027,402 | 3/1962 | Pennino | 260/539 R |

Primary Examiner—Vivian Garner
Attorney, Agent, or Firm—Connolly and Hutz

[57] ABSTRACT

Production of α-chloroacrylic acid. Acrylic acid and chlorine gas are intimately contacted with one another and the resulting crude reaction product, which predominantly consists of 2,3-dichloropropionic acid, is separated into α-chloroacrylic acid and hydrogen chloride. To this end, the reaction produce is introduced into a catalyst zone heated to 80° – 160°C and containing one or more known dehydrochlorination catalysts, wherein α-chloroacrylic acid is continuously distilled off under pressures between 10 and 100 mm of mercury.

6 Claims, No Drawings

PRODUCTION OF ALPHA-CHLOROACRYLIC ACID

It is known that 2,3-dichloropropionic acid derivates can be subjected to dehydrochlorination to produce α-chloracrylic acid derivatives. The dehydrochlorination can be effected catalytically or with the use of stoichiometric proportions of a substance capable of binding HCl. In this manner, it is readily possible to produce α-chloracrylic acid derivatives, such as the methyl ester and nitrile.

To produce free α-chloracrylic acid in satisfactory manner by subjecting 2,3-dichloropropionic acid to dehydrochlorination it is necessary, however, to use stoichiometric proportions of a substance capable of binding HCl, this making it unnecessary to use high temperatures at which resulting α-chloracrylic acid undergoes decomposition or polymerization. This, however, is always accompanied by the formation of equivalent proportions of undesirable byproduct, e.g. sodium chloride, which must be separated and removed, whereby the preparation of α-chloracrylic acid is rendered considerably more costly.

While known catalytic dehydrochlorination processes for making free α-chloracrylic acid are free from the disadvantageous phenomena reported above, the fact remains that the low yields make these processes unattractive for commercial use.

For instance, U.S. Pat. No. 2,870,193 is noted to describe in Example 2 the catalytic dehydrochlorination of 2,3-dichloropropionic acid with 15 weight percent of concentrated sulfuric acid. This results in the formation of α-chloracrylic acid containing considerable proportions of unreacted 2,3-dichloropropionic acid. In addition to this, considerable proportions of α-chloracrylic acid are lost by polymerization and thermal decomposition, which considerably impair the alleged high yield (cf. comparative Example 1a) hereinafter). The same phenomenon is encountered during the preparation of α-chloracrylic acid in accordance with U.S. Pat. No. 2,862,960, Example VI, wherein 2,3-dichloropropionic acid is subjected to dehydrochlorination with 20 weight percent of an acid ion exchanger containing sulfonic groups (cf. comparative Example 1b) hereinafter). It should be added that the 2,3-dichloropropionic acid itself is obtainable in moderate yields only, from acrylic acid.

As taught in German Patent No. 735,637, it is possible for acrylic acid in five times its quantity by weight of carbon tetrachloride to be reacted with chlorine at 0° – 5°C with the resultant formation of 2,3-dichloropropionic acid in a yield of about 65%. A. H. Schlesinger and E. J. Prill (J. Amer. Chem. Soc. 78, pages 6126 and 6127, 1956) have produced 2,3-dichloropropionic acid in similar manner in a yield of 66%.

By subjecting free 2,3-dichloropropionic acid to dehydrochlorination with the use of a catalyst useful in the dehydrochlorination of 2,3-dichloropropionic acid methylate (cf. British Patent Specification No. 793,411) it is possible to produce α-chloracrylic acid in a yield of 46.6%, based on the acrylic acid used less the quantity of unreacted 2,3-dichloropropionic acid obtained (cf. comparative Example 2a) hereinafter).

We have now unexpectedly discovered that it is possible for the yield of α-chloracrylic acid, based on acrylic acid, to be considerably improved by subjecting the crude reaction product, which is obtained on chlorinating acrylic acid, to catalytic dehydrochlorination, rather than pure 2,3-dichloropropionic acid. As has more particularly been found, the above crude product is composed to about two thirds of 2,3-dichloropropionic acid and to about one third of one or more unidentified substances. These latter substances produced as early as in the chlorinating step are at least partially dehydrochlorination products originating from further unknown intermediates and they equally produce desirable α-chloracrylic acid under the conditions selected for catalytic dehydrochlorination. In other words, if pure 2,3-dichloropropionic acid (49.7 weight percent of chlorine) were isolated from the reaction product, the above useful by-products would be lost at the price of a considerably reduced yield of α-chloracrylic acid. Due to the partial dehydrochlorination, which occurs as early as in the chlorinating step, the resulting crude reaction product merely contains about 40 weight percent of chlorine in organic combination. In this connection, it has been found advantageous to make chlorine gas directly act upon concentrated acrylic acid, preferably with the use of 0.95 to 1.5 mols of chlorine gas per mol of acrylic acid, rather than to chlorinate acrylic acid in carbon tetrachloride, as suggested in the literature. The acrylic acid should preferably be chlorinated in a countercurrent reactor to the exclusion of direct incident light with or without addition of a known chlorination catalyst, such as pyridine, dimethyl formamide or copper-II-ions. While the reaction temperature is not critical for successful chlorination, use should preferably be made of temperatures higher than the melting point and lower than the boiling point of acrylic acid or reaction product. The preferred temperatures are within 15° and 60°C. The reaction product remains liquid over several days. If it ever crystallizes, it is easy to melt by heating it.

The reaction product obtained on chlorinating acrylic acid can be separated into α-chloracrylic acid and gaseous hydrogen chloride by continuously dropping it on to a heated catalyst.

The useful catalysts include, for example, those described in the literature (cf. British Patent Specification No. 793,411 and German Patents No. 1,064,502 and 1,267,680) in connection with catalytic dehydrochlorination reactions, partiularly in connection with 2,3-dichloropropionic acid derivatives. The useful catalysts include more particularly tertiary amines (pyridine, quinoline) or tertiary phosphines (triphenylphosphine) or their hydrochlorides as well as Friedel Crafts-catalysts and further metal compounds (fluorides, chlorides, bromides, acetates and phosphates of Cu, Li, Mg, Ca, Sr, Ba, Zn, Cd, Hg, B, Al, Sn, V, Cr, Mn, Fe, Co, Ni, Pd as well as concentrated sulfuric acid, phosphoric acid, and $P_2O_5$). The useful catalyst carriers include $Al_2O_3$, $SiO_2$ or active carbon, for example. The dehydrochlorination catalysts, including carrier, if any, should preferably be used in proportions of altogether 0.1 to 5 weight percent, based on the crude reaction product of acrylic acid and chlorine gas.

The resulting α-chloracrylic acid is continuously distilled off and removed from the catalyst chamber. Due to the thermal instability of α-chloracrylic acid, it is good practice to effect the distillation under reduced pressure between 10 and 100 mm of mercury in order to maintain the boiling point of α-chloracrylic acid as low as possible.

The dehydrochlorination catalysts commence activity at temperatures between about 80° and 90°C. A certain quantity of the reaction product of chlorine and acrylic acid should conveniently be kept in contact with the dehydrochlorination catalyst to provide for a certain contact time which depends on the temperature used. Only when α-chloracrylic acid commences distillation is fresh reaction product added at the rate necessary to have an approximately constant volume in the catalyst chamber. It is also advantageous for the dehydrochlorination catalyst to be used in admixture with a polymerization inhibitor, such as hydroquinone, phenothiazine or copper-II-chloride, to stabilize the resulting α-chloracrylic acid. As can be seen, copper-II-salts are effective in three distinct ways: They catalyze the chlorination of acrylic acid and the dehydrochlorination of the resulting reaction product to α-chloracrylic acid, and they are effective α-chloracrylic acid stabilizers. Pyridine catalyzes the chlorination and dehydrochlorination in similar manner. During distillation, it is possible for the α-chloracrylic acid to be purified if use is made of a column which is packed with fillers of copper as α-chloracrylic acid stabilizers. In this case, higher-boiling 2,3-dichloropropionic acid is recycled to the catalyst chamber.

α-chloracrylic acid has a considerable tendency to sublime. As a result, the off-gas conduit downstream of the distillation receiver becomes easily clogged by pure α-chloracrylic acid crystals. This can be avoided by passing the off-gas coming from the receiver through a scrubbing column which may be a packed column having a reflux condenser mounted thereon, wherein a high boiling solvent is kept boiling under complete reflux. Scrubbed α-chloracrylic acid which is found to concentrate in the distillation flask can be obtained by crystallization. The useful high-boiling solvents, which boil at a temperature higher than 140°C, should preferably be selected from saturated hydrocarbon mixtures, e.g. Esso-Vasol or Shellsol T.

The off-gas, primarily hydrogen chloride, can be purified by freezing it in a cooling trap.

The hydrogen chloride gas set free during the dehydrochlorination can be recovered in known manner in the form of hydrochloric acid, for example, in a absorption vessel filled with dilute hydrochloric acid, for example.

The present invention provides more particularly a process for making α-chloracrylic acid comprising intimately contacting acrylic acid with chlorine gas, separating the resulting crude reaction product consisting predominantly of 2,3-dichloropropionic acid into α-chloracrylic acid and hydrogen chloride by introducing the said crude reaction product into a catalyst zone heated to temperatures between 80° and 160°C and containing one or more known dehydrochlorination catalysts and by continually distilling off α-chloracrylic acid under pressures between 10 and 100 mm of mercury.

Further embodiments of the present invention, which can be used singly or in combination, comprise:
a. intimately contacting acrylic acid and chlorine gas at temperatures between 15° and 60°C;
b. intimately contacting acrylic acid and chlorine gas in the presence of pyridine, dimethyl formamide or copper-II-salts as the chlorination catalysts, which should preferably be used in proportions between 0.1 and 5 weight percent, based on acrylic acid;
c. intimately contacting acrylic acid and chlorine gas in countercurrent manner to the exclusion of direct incident light;
d. separating the crude reaction into α-chloracrylic acid and hydrogen chloride in the presence of a polymerization inhibitor, which should preferably be used in proportions between 0.05 and 1 weight percent;
e. distilling the α-chloracrylic acid coming from the catalyst zone in a column packed with copper fillers.

As a polyfunctional compound, α-chloracrylic acid finds widespread use in chemical syntheses, for example, for the production of pharmaceutical preparations, dyestuffs and in textile finishing. Polymers of α-chloracrylic acid are used in making films, artificial glass, particularly for optical purposes, and impact-resistant coatings. α-chloracrylic acid homopolymers and copolymers have recently been described to be suitable for use in making complex formers and builders for detergent compositions.

The process of the present invention compares very favorably with prior art methods. For example, it is possible for the catalytic separation of the reaction product of chlorine and acrylic acid to be effected continuously, the resulting α-chloracrylic acid, which is obtained in high yields, being very pure.

EXAMPLE 1:(Comparative Example)

a. The process described in Example 2 of U.S. Pat. No. 2,870,193 was repeated for the purpose of comparison. To this end, 500 grams of pure 2,3-dichloropropionic acid and 75 grams of concentrated sulfuric acid were subjected to distillation and the resulting distillate passing over at a temperature between 100° and 195°C in the column base portion was collected. A mixture of 61.9 grams of α-chloracrylic acid and 24.1 grams of 2,3-dichloropropionic acid was obtained. α-chloracrylic acid was obtained in a yield of 17.5%, based on the 2,3-dichloropropionic acid which underwent conversion.

b. The process described in Example VI of U.S. Pat. No. 2,862,960 was repeated for the purpose of comparison. To this end, 500 grams of pure 2,3-dichloropropionic acid and 100 grams of an acid ion exchanger resin (Amberlite IR-120) were subjected to distillation under vacuum. At a temperature between 97° and 124°C and under a pressure between 28 and 30 mm mercury, there were obtained 213 grams of a distillate, of which 13.6 weight percent (= 29 grams) were α-chloracrylic acid and 86.4 weight percent (= 184 grams) were 2,3-dichloropropionic acid. α-chloracrylic acid was obtained in a yield of 12.3%, based on the 2,3-dichlororpropionic acid which underwent conversion.

EXAMPLE 2

The catalyst described in British Patent Specification No. 793,411 for use in the dehydrochlorination of 2,3-dichloropropionic acid methylate was tested to determine its activity in the dehydrochlorination of pure 2,3-dichloropropionic acid (experiment a) and in the catalytic separation of the crude reaction product of chlorine and acrylic acid (experiment b).

a. (Comparative experiment)

145 grams of pure 2,3-dichloropropionic acid and 40 cc of a catalyst comprising 25 weight percent of $BaCl_2$ deposited on aluminum oxide balls with a diameter between 4 and 5 mm were subjected to distillation under vacuum in a distillation flask. 1 gram of a $CuCl_2.2 H_2O$ stabilizer was introduced into the flask base portion.

Fresh and molten 2,3-dichloropropionic acid was introduced dropwise into the distillation flask at the same rate as distillate was obtained. The temperature in the flask base was between 115° and 122°C and the distillate passed over at a temperature between 98° and 104°C under a pressure between 18 and 20 mm of mercury. 2,545 grams of 2,3-dichloropropionic acid which were added dropwise over a period of 10 hours gave 2,062 grams of a distillate, of which 74 weight percent (1,526 grams) were 2,3-dichloropropionic acid and 26 weight percent (536 grams) were α-chloracrylic acid. α-chloracrylic acid was obtained in a yield of 70.6%, based on the 2,3-dichloropropionic acid which underwent conversion. This corresponded to a yield of 46.6%, based on the acrylic acid, from which 2,3-dichloropropionic acid can be produced in a yield of 66% by prior art methods.

The distillate was recrystallized from 1.2 cc/g of white spirit with a boiling range between 75° and 95°C and 256 grams of pure α-chloracrylic acid having a melting point between 64° and 65°C were isolated.

b. (Invention)

The procedure was carried out under the same conditions as those reported under (a) above save that the 2,545 grams of 2,3-dichloropropionic acid were replaced by 2,545 grams of the reaction product of chlorine and acrylic acid (cf. Example 3a) and that the reaction product was separated into its components within a period of 8.9 hours.

At a base temperature between 115° and 124°C, there were obtained 1,860 grams of a distillate which passed over at a temperature between 98° and 103°C under a pressure of 18 mm of mercury. The distillate was found to be composed of:

79.3 weight percent (1 476 grams) of α-chloracrylic acid,
18.4 weight percent (342 grams) of 2,3-dichloropropionic acid and
2.3 weight percent (42.8 grams) of β-chloropropionic acid.

α-chloracrylic acid was obtained in a yield of 80% (the yield in Experiment a) was 46.6%, based on the proportionate share of arylic acid used (1,253 grams) less the quantity of unreacted 2,3-dichloropropionic acid. The distillate was recrystallized from 1.2 cc/g of white spirit (boiling range between 75° and 95°C) and 1,228 grams of pure α-chloracrylic acid melting between 64° and 65°C were obtained.

EXAMPLE 3 a. (Chlorination of acrylic acid without catalyst)

The reaction was carried out in a continuously operated countercurrent reactor. The reactor was comprised of a jacketed and darkened glass tube in upright position, which was 1,300 mm long and 50 mm wide and of which the volume was reduced to 1.9 liters by means of Raschig rings. 182 grams/hr of acrylic acid were introduced into the reactor from above and 235 grams/hr of chlorine gas were introduced thereinto from below. The reaction temperature was maintained between 25° and 28°C by cooling from the outside. Chlorine gas in excess, which was found to contain hydrogen chloride, escaped near the upper end of the reactor. 352 grams/hr of reaction product, which contained 38.8 weight percent of chlorine in organic combination, were taken off at the reactor base, through an ascending tube.

b. 10 grams of $BaCl_2$, 5 grams of $CuCl_2 \cdot 2 H_2O$, 20 grams of pyridine, 0.5 gram of phenothiazine and 220 grams of the crude reaction product prepared as described under (a) above were heated with agitation over a period of 1.5 hours at about 80 mm of mercury and at temperatures between 126° and 130°C, in a distillation flask. Hydrogen chloride was found to escape. 220 gr/hr of the reaction product obtained in the manner described under a) above were then added through a dropping funnel and 171.4 grams/hr of a pure distillate were continuously taken off at 95°C under 22 mm of mercury.

The distillate was found to be composed of:
87.7 weight percent (150 grams) of α-chloracrylic acid,
10.0 weight percent (17 grams) of 2,3-dichloropropionic acid and
2.3 weight % (4 grams) of β-chloropropionic acid.

α-chloracrylic acid was obtained in a yield of 88.8%, based on the proportionate share of acrylic acid (112 grams) used under (a) above, less the quantity of unreacted 2,3-dichloropropionic acid.

The distillation was arrested after 26 hours. The catalyst could not be found to be inactive. The base volume was found to have been increased by 50 cc during that time.

1000 grams of the distillate were recrystallized from 1.2 liters of white spirit (boiling range between 75° and 95°C) at −16°C and 730 grams of α-chloracrylic acid melting between 63° and 64°C were obtained.

EXAMPLE 4 a. (Chlorination of acrylic acid with the use of pyridine as a catalyst)

A countercurrent reactor the same as that described in Example 3a was used and 239 grams/hr of acrylic acid were reacted therein with 232 grams/hr of $Cl_2$ in the presence of 0.5 weight % of pyridine. 399 grams/hr of a reaction product containing 40.0 weight percent of chlorine in organic combination were obtained.

b. 600 grams of the reaction product obtained in the manner described under (a) above and 40 grams of beadshaped $Al_2O_3$ having a diameter between 4 and 5 mm saturated with a $CuCl_2$-solution and dried at 100°C under vacuum were heated for 1 hour to 120°C in a distillation flask. 133 grams/hr of the reaction product obtained in the manner described under (a) above were then added dropwise and 106.4 grams/hr of a distillate passing over at a temperature between 101° and 104°C under a pressure of 19 mm of mercury were obtained.

The distillate was composed of:
77.2 weight % of α-chloracrylic acid,
20.3 weight % of 2,3-dichloropropionic acid and
2.5 weight % of β-chloropropionic acid.

α-chloracrylic acid was obtained in a yield of 80.5%, based on the proportionate share of acrylic acid used under (a) above, less the quantity of unreacted 2,3-dichloro-propionic acid. The distillation was stopped after 10 hours. The catalyst could not be found to be inactive.

1000 grams of the distillate were recrystallized from petroleum ether (boiling range between 60° and 70°C) and 758 grams of α-chloracrylic acid melting at 63° – 64°C were obtained.

EXAMPLE 5 a. (Chlorination of acrylic acid with the use of copper acrylate as a catalyst)

A countercurrent reactor the same as that described in Example 3a was used and 162.5 grams/hr of acrylic acid were reacted therein with 225 grams/hr of $Cl_2$ at 27°C in the presence of 0.5 weight percent of copper acrylate. 289 grams/hr of reaction product containing 43.0 weight percent of chlorine in organic combination were obtained.

b. 1000 grams of the reaction product obtained in the manner described under (a) above, 40 grams of $BaCl_2$, 20 grams of $CuCl_2 \cdot 2 H_2O$ and 50 grams of pyridine were heated for 4 hours to 128° – 133°C. 236 grams/hr of reaction product obtained in the manner described under (a) above were added dropwise to maintain a constant level in the distillation flask during distillation. 188.5 grams/hr of a distillate passing over at a temperature between 90° and 93°C under 26 – 28 mm of mercury were obtained. The distillate was composed of:

89.5 weight percent of α-chloracrylic acid,
8.7 weight percent of 2,3-dichloropropionic acid and
1.8 weight % of β-chloropropionic acid.

α-chloracrylic acid was obtained in a yield of 91.7%, based on the proportionate share of acrylic acid used under (a), less the quantity of unreacted 2,3-dichloropropionic acid.

The distillation was stopped after 33 hours. The catalyst activity could not be found to be inactive.

EXAMPLE 6 a. (Chlorination of acrylic acid with the use of pyridine as a catalyst)

A countercurrent reactor the same as that described in Example 3a was used and 200 grams of acrylic acid in admixture with 2 grams of pyridine were reacted therein per hour with 210 grams of chlorine gas at 30° – 32°C. 337 grams/hr of a reaction product containing 39.8 weight percent of chlorine in organic combination were obtained.

b. A distillation apparatus comprising a 1 liter round flask which was provided with dropping funnel, magnetic stirrer, distillation bridge and water-cooled receiver was used, and 220 grams of the reaction product obtained in the manner described under (a) above were heated therein for 1 hour to 125° – 130°C together with 20 grams of pyridine, 10 grams of $BaCl_2$ and 5 grams of $CuCl_2 \cdot 2 H_2O$. 220 grams/hr of the reaction product obtained in the manner described under (a) above were then added at the same temperature through the dropping funnel, and crude α-chloracrylic acid was continuously distilled off under a pressure between 14 and 16 mm of mercury. 139.7 grams/hr of a distillate were obtained.

The distillate was composed of:
94.4 weight percent of α-chloracrylic acid,
3.4 weight percent of 2,3-dichloropropionic acid and
2.2 weight percent of β-chloropropionic acid.

α-chloracrylic acid was obtained in a yield of 76.6%, based on the proportionate share of acrylic acid used under (a) above, less the quantity of unreacted 2,3-dichloropropionic acid.

The distillate was recrystallized from 1.2 cc/g of white spirit (boiling range between 75° and 95°C). 804 grams of pure α-chloracrylic acid were obtained from 1000 cc of distillate. The reaction was arrested after 48 hours. The catalyst could not be found to be less active. The volume in the distillation flask was found to have been increased by about 100 cc during that period of time.

EXAMPLE 7

A distillation apparatus the same as that described in Example 6b was used and 295 grams/hr of the reaction product of chlorine and acrylic acid obtained in the manner described in Example 3a were heated therein for 2 hours to 124° – 135°C together with 10 grams of quinoline, 10 grams of $BaCl_2$ and 5 grams of $CuCl_2 \cdot 2 H_2O$. Following this, the whole was distilled under a vacuum of 15 – 16 mm of mercury and the volume in the distillation flask was maintained by dropwise addition of 150 grams/hr of reaction product obtained in the manner described under 3a above, which was used in admixture with 0.5 weight % of quinoline. 114 grams/hr of distillate passing over at 95° – 104°C under 15 – 16 mm of mercury were obtained.

The distillate was found to be composed of:
52.7 weight percent of α-chloracrylic acid,
43.9 weight percent of 2,3-dichloropropionic acid and
3.4 weight percent of β-chloropropionic acid.

α-Chloracrylic acid was obtained in a yield of 69.1%, based on the proportionate share of acrylic acid used in Example 3a, less the quantity of unreacted 2,3-dichloropropionic acid.

1000 grams of distillate were recrystallized from white spirit (boiling range between 75° and 95°C) and 496 grams of α-chloracrylic acid melting between 63° and 64°C were obtained.

The distillation was stopped after 17.5 hours. The catalyst could not be found to be inactive.

EXAMPLE 8 a. The chlorination was effected in the manner described in Example 6a save that 220 grams/hr of chlorine gas were used. 364 grams/hr of reaction product containing 39.2% of chlorine in organic combination were obtained.

b. The distillation apparatus substantially was the same as that used in Example 6b save that a further column 20 cm long and packed with copper turnings was provided between the round flask and distillation bridge. 20 grams of $BaCl_2$, 10 grams of $CuCl_2 \cdot 2 H_2O$ and 20 grams of pyridine were heated therein for 2 hours to temperatures between 118° and 124°C together with 250 cc of the reaction product obtained in the manner described under a) above. Following this, the whole was distilled under 18 mm of mercury and 160 grams/hr of reaction product obtained in the manner described under (a) above were added dropwise to maintain the reaction volume constant. 118.4 grams/hr of distillate passing over at 81° – 83°C under 18 mm of mercury were obtained. The distillate was composed of 97.75 weight percent of α-chloracrylic acid and 2.25 weight percent of β-chloropropionic acid. α-chloracrylic acid was obtained in a yield of 89%, based on the proportionate share of arylic acid used in Example 6a. The distillation was effected over a period of 37 hours.

The catalyst could not be found to have a reduced activity.

EXAMPLE 9 a. (Chlorination of acrylic acid with the use of dimethyl formamide as a catalyst)

A countercurrent reactor the same as that described in Example 3a was used and 230 grams/hr of acrylic acid in admixture with 0.5 weight % of dimethyl formamide were reacted therein with 269 grams/hr of chlorine gas at 25°C. 440 grams/hr of reaction product containing 40.8 weight percent of chlorine in organic combination were obtained.

b. 100 grams of the reaction product obtained in the manner described under (a) above and 40 grams of $BaCl_2$, 10 grams of $CuCl_2 \cdot 2 H_2O$ and 50 grams of triphenylphosphine were heated for 4 hours to 135° – 140°C, in the distillation apparatus described in Example 6b. The whole was then distilled under a vacuum of 20 – 22 mm of mercury. 125.7 grams/hr of the reaction product obtained in the manner described under (a) above were added dropwise to maintain a constant level in the distillation flask. 91 grams/hr of a distillate passing over at 91° – 92°C were obtained. The distillate was composed of:

81.4 weight percent of $\alpha$-chloracrylic acid,
  15.7 weight percent of 2,3-dichloropropionic acid and
  2.9 weight % of $\beta$-chloropropionic acid.

$\alpha$-chloracrylic acid was obtained in a yield of 85.5%, based on the proportionate share of acrylic acid used under (a), less the quantity of unreacted 2,3-dichloropropionic acid.

Off-gas coming from the distillation receiver was introduced from below into a column in which Shellsol T was kept boiling under reflux at 20 – 22 mm of mercury. In the distillation flask, the Shellsol T was at a temperature between 78° and 80°C. Crystals could not be found to have deposited in the conduits downstream of the scrubbing column. The distillation was stopped after 14 hours. The catalyst could not be found to be inactive.

EXAMPLE 10 a. (Chlorination of acrylic acid without catalyst)

A countercurrent reactor the same as that described in Example 3a was used and 182 grams/hr of acrylic acid were reacted therein with 190 grams/hr of $Cl_2$ at 40° – 45°C. 305 grams/hr of reaction product containing 41.8 weight percent of chlorine in organic combination were obtained.

b. A distillation apparatus the same as that described in Example 6b was used and 10 grams of LiCl, 20 grams of $CuCl_2 \cdot 2 H_2O$, 10 grams of pyridine and 0.5 gram of phenothiazine in 300 grams of $\alpha$-chloracrylic acid (diluent) were heated therein to 125° – 135°C. 250 grams/hr of the reaction product obtained in the manner described under (a) above were added at that temperature through the dropping funnel and crude $\alpha$-chloracrylic acid was continuously distilled off at 16 – 20 mm of mercury. 187.5 grams/hr of distillate were obtained. The distillate was composed of:

92.2 weight percent of $\alpha$-chloracrylic acid,
  4.8 weight percent of 2,3-dichloropropionic acid and
  3.0 weight percent of $\beta$-chloropropionic acid.

The distillation was stopped after 42 hours. The catalyst could not be found to be inactive.

$\alpha$-chloracrylic acid was obtained in a yield of 80.9%, based on the proportionate share of acrylic acid used under (a), less the quantity of unreacted 2,3-dichloropropionic acid.

We claim:

1. A process for making $\alpha$-chloracrylic acid comprising intimately contacting acrylic acid with chlorine gas and separating the resulting crude reaction product consisting predominantly of 2,3-dichloropropionic acid into $\alpha$-chloracrylic acid and hydrogen chloride by introducing the said crude reaction product into a catalyst zone heated to temperatures between 80° and 160°C and containing at least one known dehydrochlorination catalyst and by continually distilling off $\alpha$-chloracrylic acid under pressures between 10 and 100 mm of mercury.

2. A process as claimed in claim 1, wherein acrylic acid and chlorine gas are intimately contacted at temperatures between 15° and 60°C.

3. A process as claimed in claim 1, wherein acrylic acid and chlorine gas are intimately contacted in the presence of pyridine, dimethyl formamide or copper-II-salts as chlorination catalysts.

4. A process as claimed in claim 1, wherein acrylic acid and chlorine gas are intimately contacted in countercurrent manner with the exclusion of direct incident light.

5. A process as claimed in claim 1, wherein the crude reaction product is separated into $\alpha$-chloracrylic acid and hydrogen chloride in the presence of a polymerization inhibitor.

6. A process as claimed in claim 1, wherein the $\alpha$-chloracrylic acid coming from the catalyst zone is distilled off in a column packed with copper fillers.

* * * * *